United States Patent
Brandlmaier

(10) Patent No.: US 7,332,082 B2
(45) Date of Patent: Feb. 19, 2008

(54) SYSTEM AND METHOD FOR BIOLOGICAL PURIFICATION OF WATER

(75) Inventor: Gerhard Brandlmaier, Wels (AT)

(73) Assignee: Rainer Grafinger, Bergkirchen (DE)

( * ) Notice: Subject to any disclaimer, the term of this patent is extended or adjusted under 35 U.S.C. 154(b) by 71 days.

(21) Appl. No.: 10/544,580

(22) PCT Filed: Feb. 5, 2004

(86) PCT No.: PCT/AT2004/000037

§ 371 (c)(1),
(2), (4) Date: Dec. 7, 2005

(87) PCT Pub. No.: WO2004/069756

PCT Pub. Date: Aug. 19, 2004

(65) Prior Publication Data

US 2006/0113245 A1    Jun. 1, 2006

(30) Foreign Application Priority Data

Feb. 6, 2003   (AT) ............................. A 190/2003

(51) Int. Cl.
*C02F 3/00* (2006.01)

(52) U.S. Cl. ...................... 210/602; 210/620; 210/618; 210/615; 210/611; 210/220; 210/167.1; 210/167.2

(58) Field of Classification Search .. 210/167.1–167.2, 210/602, 620, 220, 615–618, 610–611
See application file for complete search history.

(56) References Cited

U.S. PATENT DOCUMENTS 5,702,593 A * 12/1997 Horsley et al. ............. 210/122
6,277,274 B1    8/2001 Coffman

FOREIGN PATENT DOCUMENTS

| DE | 12 46 598 | * | 8/1967 |
|----|-----------|---|--------|
| WO | WO95/24362 | | 9/1995 |
| WO | WO97/29056 | | 1/1997 |
| WO | WO99/32406 | | 7/1999 |
| WO | 02/06198 | | 1/2002 |

OTHER PUBLICATIONS

International Search Report.

* cited by examiner

*Primary Examiner*—Chester T. Barry
(74) *Attorney, Agent, or Firm*—Collard & Roe, P.C.

(57) ABSTRACT

The invention relates to a method and a water treatment system (2) for treating and/or keeping clean water (1), in particular from swimming facilities (4), whereby the water (1) is pre-cleaned in a first step in at least one mechanical cleaning device (5, 8) and in a second step is put through a biological cleaning process in at least one biological cleaning device (12, 13). The water (1) is transported between the cleaning steps by force of gravity and the cleaned water (1) is optionally returned to the swimming facility (4).

48 Claims, 1 Drawing Sheet

SYSTEM AND METHOD FOR BIOLOGICAL PURIFICATION OF WATER

CROSS REFERENCE TO RELATED APPLICATIONS

Figure 1:
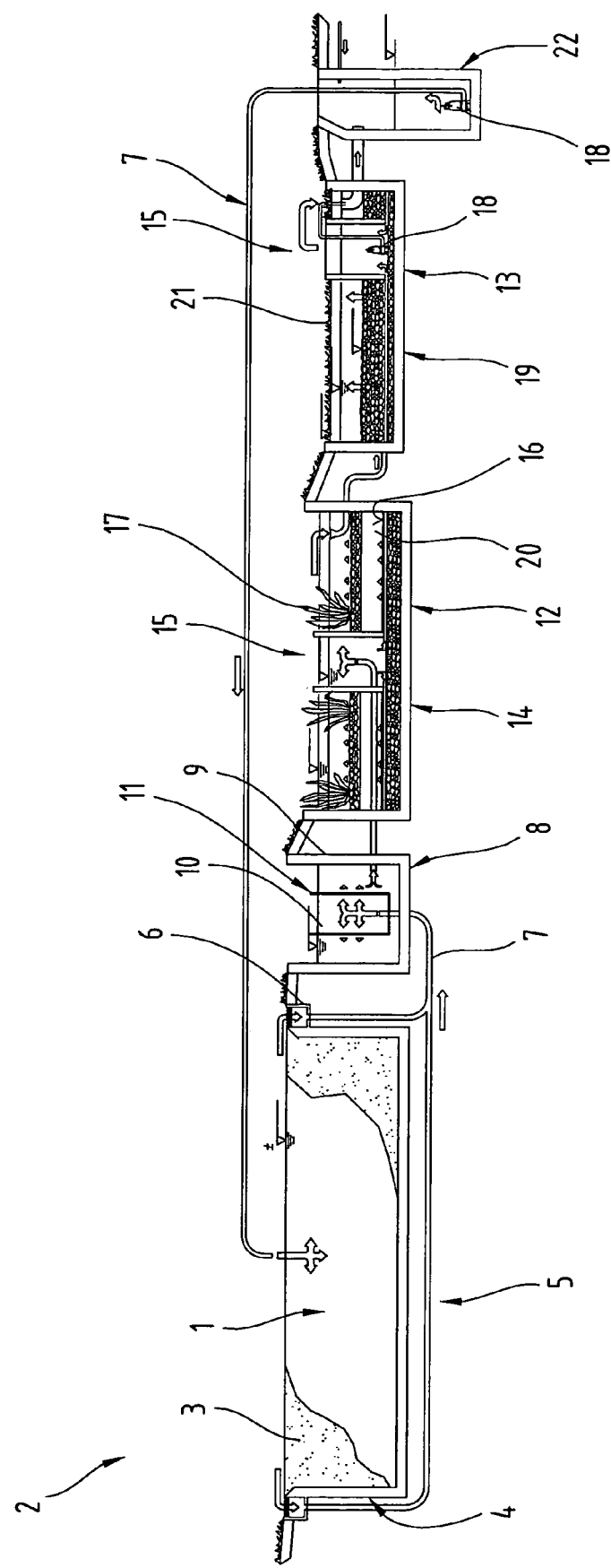

Applicant claims priority under 35 U.S.C. §119 of Austrian Application No. A 190/2003 filed Feb. 6, 2003. Applicant also claims priority under 35 U.S.C. §365 of PCT/AT2004/000037 filed Feb. 5, 2004. The international application under PCT article 21(2) was not published in English.

The invention relates to a method of treating and/or keeping clean water, in particular from swimming facilities, whereby the water is mechanically pre-cleaned in a first step and a biological cleaning process is carried out in a second step, the water being transported by force of gravity during and between the cleaning steps, with the cleaned water optionally being returned to the swimming facility, and also relates to a water treatment system for treating and/or keeping clean water, in particular from swimming facilities, having at least one mechanical and one biological cleaning device respectively, the water level in the individual cleaning devices being kept at different levels.

Given the amount of waste water produced in the alluvial system and the river pollution and spread of epidemics caused as a result, there was a need for a method of treating waste water.

As the requirements placed on cleaning waste water containing different substances have grown, a number of methods intended to reduce pollutants and harmful substances in waste water have been developed. Since the time of simple settlement tanks and sewage tanks, high technology has now been developed involving the use of chemicals.

Various methods of cleaning waste water exist, e.g. mechanical, chemical or biological methods as well as waste water treatment methods akin to natural methods in large purification plants in order to treat the water so that it can be introduced back into the water system. With these known cleaning methods, however, the cleaned water is not treated to the degree that it has the quality of drinking water.

Mechanical processes separate solid and insoluble elements from waste water. Filtration (without the involvement of micro-organisms) is a mechanical process.

Historically, with a view to using chemical processes in settlement tanks, attempts have been made to increase the settlement speed of finely distributed, insoluble substances contained in waste water using chemical substances. Nowadays, chemical cleaning processes are no longer used except as part of more thorough purification in situations where waste substances can not be broken down by microbiological processes, such as phosphates and heavy metals, for example, which form insoluble compounds at higher pH levels.

In industrial plants, precipitation agents are added (in the form of calcium or iron salts) in order to accelerate sedimentation. In addition to sedimentation processes, chemical processes are also employed, the aim of which is to break down the contents of the waste water by strong oxidising agents such as peroxides. Such processes are expensive and have only limited applications in certain types of industrial waste water.

When treating water by means of reverse osmosis, no allowance is made for the fact that important minerals such as salts are still contained in the water.

The known methods of cleaning waste water are therefore not suitable for cleaning water as a means of providing drinking water for consumption and re-introducing it back into the mains system without first introducing the water into a body of water as an intermediate stage or treating it by allowing it to pass through earth.

In particular, the known cleaning methods are not suitable for treating water intended for use in a relatively small consumption unit which is not connected to a public water mains supply.

Nor can the known methods be used to provide and operate a water supply for facilities in areas where the water supply is limited or there are no bodies of water suitable for providing a supply of drinking water.

What all biological methods have in common, from simple treatment of the land to large aeration systems, is that they break down the contents of the waste water by means of bacteria and other lower organisms.

Patent specification WO 02/06198 A1 describes a method and a device for cleaning waste water. In this instance, waste water is microbiologically aerobically treated in a first step, after which foreign bodies or particles which can not be broken down biologically are separated from the waste water in another step and this is followed by a subsequent biological cleaning process and, finally, substances which can not be broken down biologically and chemically are filtered out of the treated waste water by a subsequent filtration process. The other step involves feeding the waste water through a static sand filter, whilst other options involve the use of a dynamic sand filter, a filter with activated carbon and an ultra-filtration process. The device proposed by the invention comprises, connected in series, a microbiologically aerobic waste water cleaning unit, a unit for separating foreign bodies that are not biologically degradable and removing residual degradable substances, and a subsequent filtration unit.

Patent specification WO 97/29056 A1 describes an invention relating to a method of treating waste water from car wash facilities in a mechanical and biological treatment stage, whereby, after passing through a silt chamber, the waste water is collected in a storage tank, after which it is fed through an air filter into a bio-reactor, where it is again collected in a clean water tank after a biological clarification process for recycling, as well as a plant for implementing this specific method.

Patent specification WO 95/24362 A1 describes a system of collecting waste water from a laundry in a batch container, whereby the majority of fluffs and textile shreds are separated by means of filter screens. The volume of the container is dimensioned so that a two-day quantity of waste water can be supplied in the example described. This type of waste water is fed into a bio-reactor operating under aerobic conditions. Air is fed into the bio-reactor from the bottom end of the bio-reactor in order to create aerobic conditions. The biologically conditioned water leaves the reactor from the top end of the column-shaped bioreactor and is delivered to an activated carbon column acting as an adsorber. Having been cleaned by adsorption, the water is discharged from the adsorber packed with activated carbon and collected in a batch container, from where it is gated into the laundry as and when required, in which case up to 20% of fresh water may be fed in as required.

The disadvantage of this method and the device for implementing this method known from the prior art is that technically complex bio-reactors have to be used to a certain extent and oxygen necessarily has to be pumped into the system.

The objective of the invention is to specify a chemical-free method of treating and keeping clean waste water, which is ecologically sound, effective, rapid and inexpensive to run.

Another partial objective of the invention is to clean the waste water to the degree that it corresponds to the requirements placed on bathing water in terms of clarity as well as hygiene.

This objective is independently achieved by the invention on the basis of a method of the type outlined above, whereby the water is transported by force of gravity during and between the cleaning steps and the cleaned water is optionally returned to the swimming facility or sent to a water conditioning plant of the type outlined above, which enables the water level in the individual cleaning devices to be kept at different levels. The advantage of this is that to operate the plant and the method, only a very small amount of energy is needed to transport the water because the water can be transported from one cleaning device to the next by force of gravity. Of particular advantage in this respect is the fact that energy costs can therefore be kept very low, enabling the water treatment system to be operated very economically.

What has also proved to be of advantage is the fact that the at least one biological cleaning step takes place after the at least one mechanical cleaning step, which means that a coarse mechanical cleaning process has taken place beforehand in readiness for the biological cleaning process and only very small particles have to be removed and displaced during biological cleaning.

Yet another advantage is the fact that the at least one mechanical cleaning step takes place in at least two stages, so that mechanical conditioning takes place in at least two stages, in which case a coarse pre-cleaning process can be carried out in a first cleaning stage and the water can be put through a mechanical fine cleaning process in the other cleaning stage.

In accordance with another method step, impurities are removed in a first mechanical cleaning stage by separating biomass floating on the surface of the swimming facility, after which surface impurities in the water have already been eliminated during the first cleaning step and only impurities in the water itself have to be removed during the subsequent process steps.

Accordingly, it has proved to be of particular advantage in a second mechanical cleaning stage to separate biomass suspended in the water by filtration using a filter, which means that all particulate impurities have been removed during the mechanical cleaning step and there is therefore no need to take account of them during the subsequent process steps.

The filtration may also be operated with a filter which does not require back-washing, in which case the method can be shortened by one method step because the second mechanical cleaning stage is operated without any back-washing and the filter cake deposited on the filter surface is removed when permeability is reduced instead of having to back-wash a filter, which obviates the need to provide an additional conveying unit for back-washing purposes.

The at least one biological cleaning step can be operated in at least two stages, in which case the water can be cleaned particularly thoroughly and carefully by connecting two stages one after the other.

In another variant of the method step of the invention mentioned above, the at least one biological cleaning step is operated with aerobic microorganisms, which means that any unpleasant odour caused by the degradation process of anaerobic microorganisms can be avoided and this method can also be operated in the vicinity of residential areas or housing.

To this end, in one variant, the aerobic microorganisms are added at regular intervals, e.g. annually, to the at least one biological cleaning step, which means that a constant colonisation with aerobic bacteria can be guaranteed and conditions of the method can be kept constant throughout the entire method during the whole season.

In the first and/or second biological cleaning stage, metabolites can be made available as nutrients for plants, reducing costs for additional fertiliser for plants which have been planted in the vicinity of the swimming facility.

It has also proved to be of advantage if, in a first and/or second biological cleaning stage, the water is fed to a distributor shaft so that the water circulates through the cleaning stage from the bottom upwards, so that surface water rich in oxygen is fed through the denser bacterial colonisation in the region of the hair roots of the water plants, thereby ensuring that the degradation process will proceed without giving rise to odours.

The water can be fed uniformly through the distributor shaft by means of distributor drains disposed in a star-shaped or annular layout in a bottom drainage layer, which prevents any short-circuiting in the flow and stops the efficiency of the filter from being impaired.

In another method step, human pathogenic germs are removed from the cleaned water during the second stage of the at least one biological cleaning step by means of antagonists, thereby eliminating foreign germs that are harmful to the health, so that persons using this cleaned water are not at risk, whilst removing these human pathogenic germs also ensures that a conducive biotic environment is created for the microorganisms intended to clean the water. The organic elements created by the degradation of human pathogenic germs can be made available to the underground ground filter as nutrients for the bacterial colonies with which it is inoculated.

In another embodiment of the method proposed by the invention, a water level of the second cleaning stage can be intermittently varied, which makes better use of the inner filter surface and thus improves the quality properties of the water. Another advantage is the fact that negative pressure is generated by this method step and air is sucked into the ground filter, which causes the filter to breathe, creating optimum aerobic conditions for the bacterial colonisation of the ground filter.

It has also proved to be of advantage to blow oxygen and/or carbon dioxide into the fine filter or ground filter, which reduces algae growth.

Also of advantage is the fact that the water levels of the individual cleaning stages are kept at different levels, which means that the water can be transported from the individual cleaning stages to the subsequent cleaning stages with a low amount of energy.

As a result of this method, the water from domestic swimming facilities, e.g. swimming pools, ponds, etc. as well as public swimming facilities such as ponds, lakes, etc., can be cleaned, and this method is very versatile, needing no adaptation procedures.

In another embodiment of the method, the water containing residues from humans, animals or mixtures thereof, etc. can be cleaned and germs resulting from the organic residues of living beings which cause disease can be removed, thereby ensuring that the water no longer presents any risk to health.

In another embodiment of the method, water lost as a result of the process can be replaced by adding fresh water, which means that there is always a sufficient quantity of fluid in the swimming facility, which therefore always satisfies constant requirements.

It is also possible to add extra nutrients to the water to be cleaned for the microorganisms, thereby creating optimum living conditions for the microorganisms and ensuring continuous cleaning of the same quality during the method as a whole throughout the entire duration.

It has also proved to be of advantage if the cleaning devices are disposed on different levels, which means that less energy is needed to transport the water and the water treatment system can be operated very economically.

In another embodiment of the water treatment system, the mechanical cleaning devices have a first and/or a second filter, which means that the water can be carefully pre-cleaned to remove particulate dirt.

In one embodiment, the first mechanical cleaning device is provided in the form of an overflow channel disposed at the basin edge of the swimming facility, which enables the surface to be pre-cleaned of any floating biomass so that only material suspended in the water has to be removed in a subsequent step.

In another variant of the above embodiment of the invention, a front edge of the overflow channel on the water side is disposed higher above the water level of the swimming facility than the overflow channel edge lying opposite it, as a result of which floating biomass, such as leaves and such like for example, can be removed simply by sweeping them up. It has also proved to be of advantage that dirt floating on the surface is not able to get back into the swimming facility.

Another advantage is the fact that a filter shaft is provided in at least one of the two mechanical cleaning devices, in which the filter is disposed, so that dirt contained in the water can be filtered out and held back on the filter surface.

In another variant of the embodiment of the invention outlined above, at least one of the two filters is a fine filter, in particular in the form of a filter cylinder, as a result of which small crabs are held back in the filter cylinder and are always supplied with water with a high oxygen content as well as not being prey to natural predators.

The filter may be retained by means of a sheet of perforated metal, e.g. a perforated stainless steel sheet, thereby enabling water to pass through the fine filter.

In another variant of the above-mentioned embodiment of the invention, the filter, in particular a filter screen, is made from a polypropylene non-woven material, which is intended to guarantee sufficient permeability for fine filtration of the water.

In another variant of the above-mentioned embodiment, the filter has a permeability which is selected so as to be within a range with an upper limit of 100 l/m/h, in particular 90 l/m/h, preferably 80 l/m/h and a lower limit of 30 l/m/h, in particular 50 l/m/h, preferably 60 l/m/h, thereby removing the smallest particles of dirt from the water.

In another embodiment, the biological cleaning device has a first and a second ground filter, on the one hand imitating artificial ground water with the first ground filter and on the other hand optimising degradation processes with the second ground filter in the underground region.

In another embodiment, distributor drains are provided inside the biological cleaning device, which are disposed in a star-shaped or annular layout in particular, thereby preventing the flows from short-circuiting and thus impairing the efficiency of the filter.

Another advantage is the fact that a distributor shaft is provided in the ground filter, which is preferably centrally disposed, as a result of which the water to be cleaned flows through the ground filter from the bottom upwards, which means that water with a high oxygen content is delivered to the denser bacterial colonisation in the hair root area of the water plants enabling an aerobic, odourless degradation process.

In another embodiment, a unit for conveying water, in particular a pump, is provided in the distributor shaft of the second biological cleaning device, as a result of which the water level in the underground filter can be intermittently varied, thereby making better use of the inner filter surface. This process results in a negative pressure causing air to be sucked in and the filter is able to breathe as a result. Once the pump is switched off, the ground filter can be filled by force of gravity again, thereby saving the energy that would otherwise be required.

In another embodiment of the invention, the ground filter has several layers, which in particular are made from a porous base material and are preferably particulate, which on the one hand ensures that the ground filter can be suitably vented and on the other hand means that different cleaning steps can be performed due to the arrangement of several layers, such as the adsorption of phosphorous and nitrogen on ion exchangers, for example. This being the case, it has proved to be of advantage if the porous base material is made from carbon, clay, silica gel, quartz sand, foam, plastic flocks or zeolites, optionally in the form of pellets, which means that different cleaning conditions can be created by using different materials, such as the adhesion of microorganisms or nutrients, for example.

It has also proved to be of advantage if the diameter of the porous base material decreases from the bottom upwards in the direction towards the water level, which means that a mechanical cleaning process is also run indirectly in the ground filter of the biological cleaning stage.

The porous base material is colonised by microorganisms, causing a biological degradation process of impurities in the water and obviating the need to add chemicals to clean the water, which would result in environmental pollution.

In another variant of the embodiment of the invention outlined above, the microorganisms selected are from a group consisting of *Cytophaga* species, *Sporocytophaga* species, *Pseudomonas* species, *Achromobacter* species, *Flavobacterium* species, *Micrococcus* species, *Mycobacterium* species, *Nocardia* species, *Vibrio cuneata*, *Serratia* species, *Bacillus* species, *Thiobacillus* species, etc., thereby resulting exclusively in aerobic microorganisms for the process of degrading impurities in the water and avoiding bad odours.

In another variant, the ground filter incorporates an ion exchanger layer so that metabolites, which occur as a result of the degradation of chemical elements such as phosphorous and nitrogen, for example, can be adsorbed and thus taken out of the system.

In this respect, it has proved to be of advantage if the ground filter of the first biological cleaning device with the plants is irrigated by flooding, which means that released organic substances flowing through this ground filter can be removed.

In another variant of the above-mentioned embodiment of the invention, water plants, in particular bog plants, are disposed in the first biological cleaning device, so that environmental damage caused by humans can be at least partially eliminated.

In another variant of the above-mentioned embodiment of the invention, bog plants are selected from a group consisting of the family of helophytes and/or hydrophytes, which enables a significant improvement in cleaning efficiency due to the interaction within these plant families or between the plant families and the microorganisms.

It has also proved to be of advantage if the ground filter of the second biological cleaning device is disposed underground, which enables nutrients to be removed from the system.

In another embodiment of the above-mentioned variant, it is also of advantage if the ground filter of the second biological cleaning device is planted with plants, so that degradation products from the biological cleaning stage of photosynthetic production are taken there and thus removed from the system when the plants are removed, e.g. when the lawn is mown.

In another embodiment of the invention, a compensation tank is provided after the last biological cleaning device and a conveying unit is preferably provided in it, such as a pump for example, so that the cleaned water can be returned to the swimming facility and made available for re-us, obviating the need to draw on new resources.

In another variant of the above-mentioned embodiment, the first or second mechanical cleaning device has a flow connection to the first biological cleaning device via at least one line, in which case an outlet of the line is disposed in the first biological cleaning device above the distributor shaft, as a result of which the water fed through the distributor shaft and via the distributor drains arrives in the ground filter and flows through from the bottom upwards and is fed away again, circulating through the individual layers of the ground filter at the same time.

In another variant of the above-mentioned embodiment of the invention, it has proved to be of advantage if the lines open into the distributor shaft, which is preferably centrally disposed, as a result of which the water to be cleaned is distributed uniformly through the entire region of the ground filter, thereby ensuring a continuity of the water-cleaning process.

The at least one biological cleaning device is disposed after at least one mechanical cleaning device as viewed in the flow direction of the water, which means that particulate dirt can already be removed from the water in the mechanical cleaning device and only a fine cleaning process is needed in the biological cleaning device in order to remove organic dirt from the water.

The invention will be explained in more detail below with reference to an example of an embodiment illustrated in the appended drawing. It shows:

FIG. 1 a schematic diagram of a water treatment system.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

The method of treating and/or keeping clean water 1 in a water treatment system 2 is based on at least one mechanical and one biological cleaning step respectively, and in a preferred embodiment of the method, as schematically illustrated in FIG. 1, this tales place in a two-stage mechanical cleaning step and a two-stage biological cleaning step.

The water 1 is transported between the individual cleaning stages of the cleaning steps by force of gravity, the mechanical cleaning step taking place before the biological cleaning step.

In order to separate floating biomass 3, the swimming facility 4 is provided with a first mechanical cleaning device 5, such as an overflow channel 6 in the form of a leaf trap for example, the front edge of which on the water side is higher than the peripheral edge of the swimming facility. This means that leaves and floating dirt can be removed simply by sweeping them up and the floating biomass 4 is not able to get back into the swimming facility 4 if the overflow channel 6 spills over.

The water 1 is fed in a line 7 to the second mechanical cleaning device 8 by force of gravity. Suspended biomass 3 is separated in the second mechanical cleaning step.

Once the water 1 has passed through the channel grating of the first mechanical cleaning stage, the water 1 to be cleaned, in particular bathing water, flows through the line 7 into a filter shaft 9. This filter shaft 9 contains a filter 10, such as a fine filter in the form of a filter cylinder 11 and/or a filter screen for example, which operate by gravitational force. The filter 10 may be of a two-part or multi-part design, in which case the outer casing of the filter cylinder 11 is a screening device, such as perforated sheet metal for example, in particular a sheet of perforated stainless steel, and the inner casing of the filter cylinder 11 consists of a fine filter. The water 1 to be cleaned opens into the filter cylinder 11 via the line 7 and flows through the filter 10 by force of gravity so that suspended dirt can be held back on the filter surface.

The filter material used is a polypropylene non-woven material with an appropriate permeability and a density of 300 $g/m^2$ (3 mm thick). The permeability is selected so that it is within a range with an upper limit of 100 l/m/h, in particular 90 l/m/h, preferably 80 l/m/h and a lower limit of 30 l/m/h, in particular 50 l/m/h, preferably 60 l/m/h (water throughput Q in the plane at 0.02 bar in accordance with EN 350 12958). Alternative filter materials which might be used are also silicate filters 10.

In conventional filter systems, filters 10 of this type are operated on the back-wash principle in order to remove the filter cake, which results in longer service life and permeability of the filter 10 but this means that energy has to be used for the back-washing process. By contrast with conventional floatable filters, the described filter 10 is not back-washed. The filter cake deposited on the filter surface is removed when permeability decreases. This can be done at regular intervals, such as weekly or monthly, for example, but preferably only once a year or at the end of the bathing season. Either the filter cake only or the filter cake and the filter 10 can be removed.

This system prevents small crabs which fulfil a cleaning function from getting into the other treatment stages. The small crabs remain in the filter vessel, where they are constantly supplied with oxygen-rich water 1 and are not prey to natural predators.

Once the water 1 has passed through the filter 10, it is fed via another line 7 into the first and/or second biological cleaning device(s) 12, 13. The biological cleaning step follows the mechanical cleaning step and like the latter is also operated in two stages in a preferred embodiment.

The first stage is provided in the form of a planted ground filter 14 irrigated by flooding, which is made up of several layers. In this phase, the mechanically pre-cleaned water 1 contains dissolved organic substances. The line 7 opens into a distributor shaft 15, which is preferably centrally disposed. The water 1 to be cleaned passes from the distributor shaft 15 via a distributor system 16, preferably provided in the form of a drainage system, into the planted ground filter 14 irrigated by flooding and flows through it. These distributor drains are preferably disposed in a star-shaped or annular pattern, starting in the distributor shaft 15, and are laid in the lowermost layer. In order to make the best possible use of the inner filter surface, the water 1 to be finely cleaned is fed via the distributor shaft 15 to the bottom layer containing no fine parts. This layout prevents any short-circuiting of the flows and thus any impairment of the ground filter.

The ground filter is made from a porous base material. It is preferably arranged so that the grains are staggered, in which case the grain size decreases from the bottom upwards. The base material is provided in the form of carbon, clay, silica gel, quartz sand, foam plastic flocks or zeolites, optionally in the form of pellets.

In a preferred embodiment, the planted ground filter 14 irrigated by flooding is constructed as follows. The ground filter essentially consists of limestone in the form of washed round gravel. It is preferably disposed in the bottom layers of the ground filter. This is followed by lime sand in the layers laying above, preferably with round grains and with the grain size decreasing form the bottom upwards.

Integrated in the layer in which the drains are disposed are zeolites, in particular with a high proportion of montmorillonite. In the second biological cleaning device 13, 18, quartz sand (4 to 7 mm) lies above the layer of lime sand.

Clay containing iron is disposed in the region of the water plants 17 of the first biological cleaning device 12, which is mixed with quartz sand to obtain an appropriate permeability value.

In an alternative embodiment, the ground filters 14, 19 are also made up of lime sand, quartz sand, clay, foam plastic flocks and carbon, for example, in which case the order of the individual layers is as specified from the bottom upwards. The sequence of the layers and the composition of the ground filters 14, 19 may differ in other alternative embodiments.

The described composition on the one hand has a sufficient ion exchanger capacity for the ionic degradation products which occur whilst the lime has a buffering effect to counteract more pronounced fluctuations in pH value.

The base material is colonised with aerobic microorganisms selected from a group consisting of *Cytophaga* species, *Sporocytophaga* species, *Pseudomonas* species, *Achromobacter* species, *Flavobacterium* species, *Micrococcus* species, *Mycobacterium* species, *Nocardia* species, *Vibrio cuneata*, *Serratia* species, *Bacillus* species, *Thiobacillus* species, etc.

The water 1 to be fine cleaned flows through the ground filter from the bottom upwards and carries oxygen-rich water 1 to the denser microbial colonies in the hair root region of the water plants 17, thereby guaranteeing an odourless aerobic degradation processes.

The water 1 to be cleaned passes from the planted ground filter 14 irrigated by flooding via an overflow to another line 7, which establishes a connection with the second biological cleaning device 13.

In the second biological cleaning stage, water 1 to be cleaned is distributed by mean of the distributor system 16, in particular distributor drains, in the ground filter. Due to the fact that a distributor shaft 15 is provided in which a conveying unit 18 such as a pump is housed, ground water is artificially imitated. It is in this second stage that the actual fine cleaning, water clarification and elimination of harmful germs takes place. These germs are combated by more suitably adapted token species which are antagonists to pathogenic germs. By creating ideal conditions, conducive biotic conditions automatically occur, which are necessary if human pathogenic germs are to be combated effectively. The remainder of dissolved organic substance acts as a nutrient in the underground ground filter 19 for the microbial colonisation which occurs there. As described with reference to the first biological cleaning device 12, these consist of pre-cultivated aerobic aquatic bacteria.

The planted ground filters 14, 19 irrigated by flooding and/or underground are inoculated with these at regular intervals, preferably once a year, for example at the start of the bathing season. The nutrients released by bacterial degradation, such as phosphorous and nitrogen for example, exist in ionic form and are largely absorbed on natural ion exchangers 20 contained in the ground filter.

In order to make better use of the inner filter surface, the water level in the second biological cleaning device 13 is intermittently varied by means of a conveying unit 18 such as a pump, for example. This procedure causes a negative pressure so that air is sucked in and the ground filter is therefore able to breathe as a result. The ground filter is then filled by gravitational force again.

In a preferred embodiment, the underground ground filter may be covered with an appropriate non-woven matting of polypropylene (1.000 g/m2). This non-woven matting may be planted. For example, turf may be rolled onto this non-woven matting which will take root through the mat into the washed quartz sand layer (4 to 7 mm) underneath within a few days as a hydro-culture. As a result of this feature, the degradation products from the second biological cleaning stage become involved in photosynthetic processing and can be taken out of the system by removing plants 21, for example mowing.

Up to 100% of the cleaned water 1 can be recycled as cleaned water 1 and fed back into the cleaning process.

The compensation tank 22 provided in the swimming facility 4 illustrated in FIG. 1 contains a conveying unit 18 for the main circuit such as a circulation pump, for example, and conveys the cleaned water 1 back into the swimming facility 4 in order to keep the water level constant, it being above the water level of the cleaning devices. Any water losses due to processing are compensated by adding fresh water.

The different water levels of the different cleaning devices 5, 8, 12, 13 will be described below. The specified figures represent selected examples.

The water level of the second mechanical cleaning device 8 is 50 cm, preferably 40 cm, in particular 30 cm lower than the water level of the swimming facility 4, for example.

The water level of the distributor shaft 15 is disposed 60 cm, preferably 50 cm, in particular 40 cm, below the swimming facility 4. The height of the water level of the first biological cleaning device 12 lies more or less at the same height as the water level of the second mechanical cleaning device 8. The water level of the first biological cleaning device 12 therefore lies at a lower height than the water level of the distributor shaft 15.

The planted surface of the second biological cleaning device 13 is disposed 50 cm, preferably 40 cm, in particular 30 cm, below the height of the water level of the swimming facility 4. The water level in the second biological cleaning device 13 is preferably 60 cm, in particular 50 cm, below the water level of the swimming facility 4. However, since the water level in the second biological cleaning device can be intermittently varied, the water level is subject to bigger fluctuations and may drop as much as 1 m below the water level of the swimming facility 4. The water level in the second biological cleaning device 13 may also be 70 cm or 80 cm below the water level of the swimming facility 4, for example.

The water level in the compensation tank 22 is selected so that it is within a range with an upper limit of 40 cm, preferably 50 cm, in particular 60 cm, and a lower limit of 90 cm, preferably 100 cm, in particular 110 cm, below the water level of the swimming facility 4, in which case water from the compensation tank can be conveyed back to the swimming facility 4 by means of a conveying unit 18.

A very low amount of energy is needed to run the described embodiment of the invention.

In order to clean a total water quantity of 130 m$^3$, it is enough to operate two pumps with a total rating of 0.7 KW. The running time of the alternately running pumps is 6 hours a day in total. During the remaining 18 hours, the system operates by gravitational force (levelling out). This economic operating mode is achieved due to the layout of the cleaning devices 5, 8, 12, 13 at different heights, for example due to a difference in water level of 20 cm.

The examples of embodiments described above illustrate possible variants of the water treatment system 2 although it should be pointed out at this stage that the invention is not restricted to the variants specifically described and instead, the individual variants may be combined with one another in various ways and these variations and options are within the ability of a person skilled in this technical field based on the technical teaching relating to the subject-matter of the invention. Accordingly, all conceivable embodiments which can be achieved by combinations of individual details of the variants described and illustrated are possible and fall within the protective scope of the invention.

For the sake of good order, it should finally be pointed out that in order to provide a clearer understanding of the structure of the water treatment system 2, it and its constituent parts are illustrated to a certain extent out of proportion and/or on an enlarged scale and/or on a reduced scale.

The underlying objectives and the solutions proposed by the invention may be found in the description.

LIST OF REFERENCE NUMBERS

1 Water
2 Water treatment system
3 Biomass
4 Swimming facility
5 1$^{st}$ mechanical cleaning device
6 Overflow channel
7 Line
8 2$^{nd}$ mechanical cleaning device
9 Filter shaft
10 Filter
11 Filter cylinder
12 1$^{st}$ biological cleaning device
13 2$^{nd}$ biological cleaning device
14 Planted ground filter
15 Distributor shaft
16 Distributor system
17 Water plants
18 Conveyor unit
19 Underground ground filter
20 Ion exchanger

The invention claimed is:

1. Method of treating and/or keeping clean water from swimming facilities (4), using a water treatment system (2) with at least one first mechanical device and, separate therefrom, at least one biological cleaning device, wherein the water level in the individual cleaning devices (5, 12) is kept at different levels and wherein the at least one biological cleaning device has a first and/or a second around filter (14, 19), whereby the water (1) is mechanically pre-cleaned in at least one mechanical cleaning step and is subjected to a biological cleaning process in at least one biological cleaning step, wherein the water (1) is transported between the cleaning steps by force of gravity and the cleaned water (1) is optionally returned to the swimming facility (4).

2. Method as claimed in claim 1, wherein the at least one biological cleaning step takes place after the at least one mechanical cleaning step.

3. Method as claimed in claim 1, wherein the at least one mechanical cleaning step takes place in at least two stages.

4. Method as claimed in claim 3, wherein impurities are removed from biomass (3) floating on the surface of the swimming facility (4) during a first mechanical cleaning stage.

5. Method as claimed in claim 3, wherein the biomass (3) suspended in the water (1) is removed by filtration with a filter (10) during a second mechanical cleaning stage.

6. Method as claimed in claim 5, wherein the filtration process is operated using a filter (10) without back-washing.

7. Method as claimed in claim 1, wherein the at least one biological cleaning step takes place in at least two stages.

8. Method as claimed in claim 1, wherein the at least one biological cleaning step is operated using aerobic microorganisms.

9. Method as claimed in claim 8, wherein the aerobic microorganisms are added to the at least one biological cleaning step at regular intervals.

10. Method as claimed in claim 7, wherein metabolites are made available as nutrients for plants (21) in the first and/or second biological cleaning stage.

11. Method as claimed in claim 7, wherein the water (1) is delivered to a distributor shaft (15) so that the water (1) circulates through the cleaning stage from the bottom upwards in a first and/or second biological cleaning stage.

12. Method as claimed in claim 11, wherein the water (1) is delivered uniformly via the distributor shaft (15) by means of distributor drains of a bottom drainage layer disposed in a star-shaped or annular layout.

13. Method as claimed in claim 7, wherein human pathogenic germs are removed from the cleaned water (1) by antagonists due to the second stage of the at least one biological cleaning step.

14. Method as claimed in claim 7, wherein a water level of the second cleaning stage is intermittently varied.

15. Method as claimed in claim 1, wherein oxygen and/or carbon dioxide is blown into the fine filter or ground filter (14, 19).

16. Method as claimed in claim 1, wherein the water level of the individual cleaning stages is kept at different levels.

17. Method as claimed in claim 1, wherein water (1) from domestic swimming facilities (4) is cleaned on the one hand and on the other hand from public swimming facilities (4).

18. Method as claimed in claim 1, wherein water (1) containing organic residues from humans and animals as well as mixtures thereof is cleaned.

19. Method as claimed in claim 1, wherein water losses due to processing are replaced by adding fresh water.

20. Method as claimed in claim 1, wherein extra nutrients for the microorganisms are added to the water (1) to be cleaned.

21. Water treatment system (2) for treating and/or keeping clean water (1) from swimming facilities (4), with at least one first mechanical device and, separate therefrom, at least one biological cleaning device, wherein the water level in the individual cleaning devices (5, 12) is kept at different levels; and wherein the at least one biological cleaning device has a first and/or a second ground filter (14, 19).

22. Water treatment system (2) as claimed in claim 21, wherein the cleaning devices (5, 8, 12, 13) are disposed on different levels.

23. Water treatment system (2) as claimed in claim 21, wherein the mechanical cleaning device(s) (5, 8) have a first and/or a second filter (10).

24. Water treatment system (2) as claimed in claim 21, wherein the first mechanical cleaning device (5) is provided in the form of an overflow channel (6) disposed at the basin edge of the swimming facility (4).

25. Water treatment system (2) as claimed in claim 24, wherein a front edge of the overflow channel (6) on the water side is higher by reference to the water level of the swimming facility (4) than the overflow channel edge lying opposite it.

26. Water treatment system (2) as claimed in claim 21, wherein a filter shaft (9) in which a filter (10) is housed is provided in at least one of the two mechanical cleaning devices (5, 8).

27. Water treatment system (2) as claimed in claim 23, wherein at least one of the two filters (10) is provided in the form of a fine filter cylinder (11).

28. Water treatment system (2) as claimed in claim 26, wherein the filter (10) is retained by a sheet of perforated metal.

29. Water treatment system (2) as claimed in claim 26, wherein the filter (10) is made from a polypropylene non-woven material.

30. Water treatment system (2) as claimed in claim 26, wherein the filter (10) has a permeability selected so as to be in a range with an upper limit of 100 l/m/h and a lower limit of 30 l/m/h.

31. Water treatment system (2) as claimed in claim 21 wherein distributor drains are disposed inside the biological cleaning devices (12, 13).

32. Water treatment system (2) as claimed in claim 21, wherein a distributor shaft (15) is provided in the ground filter.

33. Water treatment system (2) as claimed in claim 21, wherein a conveying unit for water (1) is disposed in the distributor shaft (15) of the second biological cleaning device (13).

34. Water treatment system (2) as claimed in claim 21, wherein the ground filter (14, 19) has several layers of a porous base material.

35. Water treatment system (2) as claimed in claim 34, wherein the porous base material comprises carbon, clay, silica gel, quartz sand, foam plastic flocks or zeolites.

36. Water treatment system (2) as claimed in claim 34, wherein the diameter of the porous base material decreases from the bottom upwards in the direction towards the water level.

37. Water treatment system (2) as claimed in claim 34, wherein the porous base material is colonized with microorganisms.

38. Water treatment system (2) as claimed in claim 37, wherein the microorganisms are selected from a group consisting of *Cytophaga* species, *Sporocytophaga* species, *Pseudomonas* species, *Achromobacter* species, *Flavobacterium* species, *Micrococcus* species, *Mycobacterium* species, *Nocardia* species, *Vibrio* cuneata, *Serratia* species, *Bacillus* species, and *Thiobacillus* species.

39. Water treatment system (2) as claimed in claim 21, wherein the ground filter (14, 19) contains an ion exchanger.

40. Water treatment system (2) as claimed in claim 21, wherein the ground filter (14) of the first biological cleaning device (12) is planted and irrigated by flooding.

41. Water treatment system (2) as claimed in claim 40, wherein water plants (17) are provided in the first biological cleaning device (12).

42. Water treatment system (2) as claimed in claim 40, wherein bog plants are selected from a group consisting of the family of helophytes and/or hydrophytes.

43. Water treatment system (2) as claimed in claim 21, wherein the ground filter (19) of the second biological cleaning device (13) is disposed underground.

44. Water treatment system (2) as claimed in claim 43, wherein the ground filter (19) of the second biological cleaning device (13) has plants (21) growing on it.

45. Water treatment system (2) as claimed in claim 21, wherein a compensation tank (22) is provided after the last biological cleaning device (13), in which a conveying unit (18) is provided.

46. Water treatment system (2) as claimed in claim 21, wherein the first or second mechanical cleaning device (5, 8) has a flow connection to the first biological cleaning device (12) via at least one line (7) and the outlet of the line (7) is disposed in the first biological cleaning device (12) above the distributor system (16).

47. Water treatment system (2) as claimed in claim 46, wherein the at least one line (7) opens into the distributor shaft (15).

48. Water treatment system (2) as claimed in claim 21, wherein the at least one biological cleaning device (12, 13) is disposed after the at least one mechanical cleaning device (5, 8) as viewed in the flow direction of the water (1).

* * * * *